United States Patent Office 3,269,752
Patented August 30, 1966

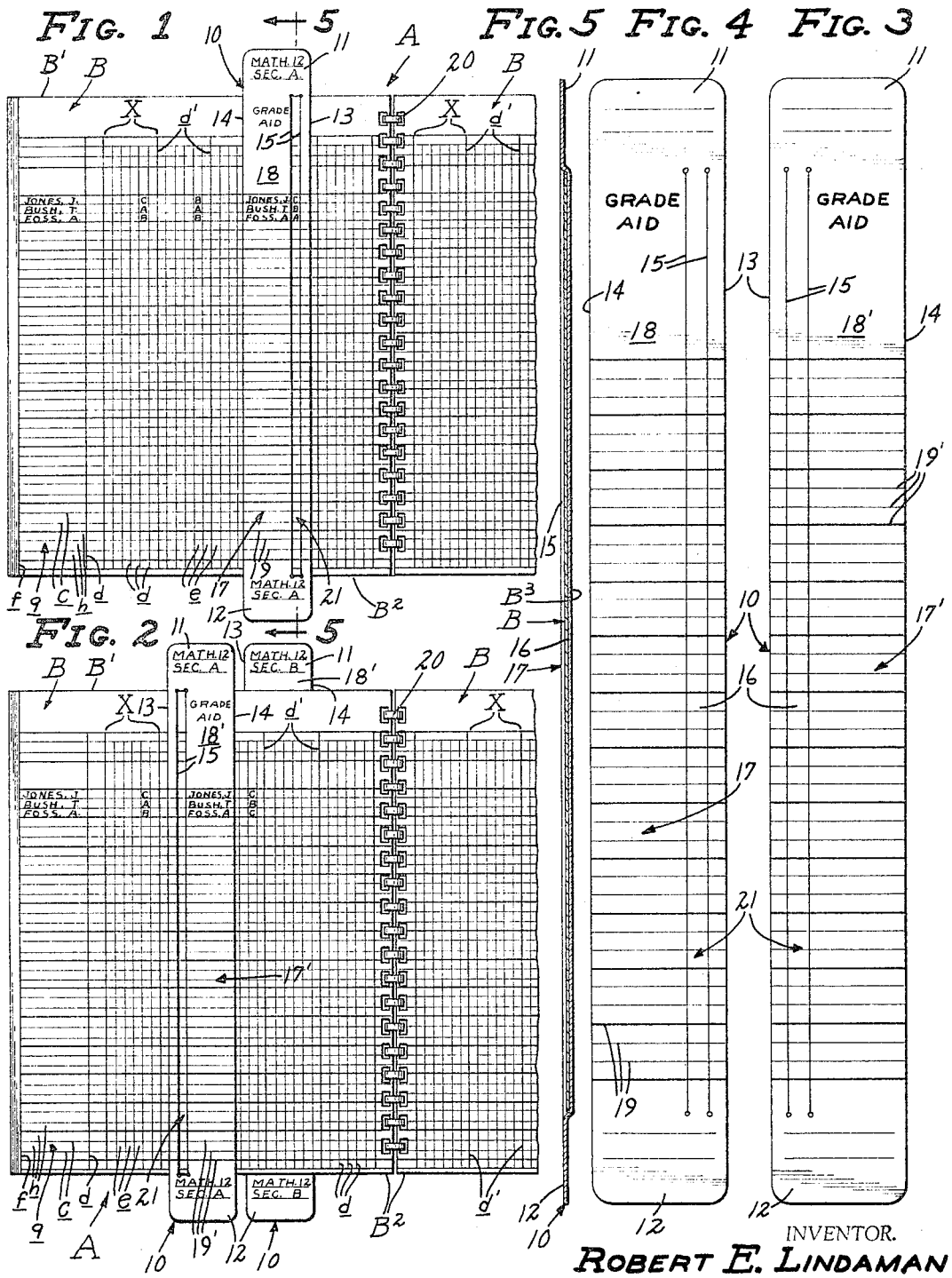

3,269,752
VISUAL GUIDE FOR RECORD SHEETS
Robert E. Lindaman, 776 Highland Road,
Windom, Minn.
Filed Dec. 9, 1963, Ser. No. 329,142
1 Claim. (Cl. 283—65)

My invention relates generally to visual guides for record sheets of the type which are adapted to be slidably moved transversely over a sheet for purposes of making accurate recordings thereon in a minimum of time.

More particularly, my invention relates to visual guides for record sheets having thereon an area of spaced parallel horizontal lines and uniformly spaced parallel vertical lines which intersect said horizontal lines, and has for its primary object a strip-like body which may be slidably mounted on a given record sheet for movements transversely thereof, at least one face of said body being provided with horizontal lines which are spaced apart distances corresponding to the spacings between the horizontal lines on said sheet, and which become aligned with the horizontal lines on said sheet when said body is operatively slidably mounted on said sheet, whereby to facilitate accurate recording of data completely across said sheet with but a minimum of eye strain.

A further object of my invention is the provision of a device of the class described wherein the means for mounting said strip-like body upon said sheet comprises a pair of closely spaced slits which form an anchoring band adapted to engage the underside of said sheet when said sheet is caused to extend transversely through said slits.

A further object of my invention is the provision of a device of the class immediately above described wherein the spacing between said slits is such as to define a vertically elongated viewing aperture of less width than the spacing between any three adjacent vertical lines on said sheet, whereby to completely expose the space between any two adjacent of said vertical lines as said body is moved transversely of said sheet.

A further object of my invention is the provision of a device of the class immediately above described wherein the slits and viewing aperture are closely spaced with respect to one longitudinal side edge of said body whereby to provide, adjacent the opposite longitudinal edge of said body, a relatively wide surface area for recording of legendary material corresponding to that normally contained on the outer edge of said sheet.

A still further and important object of my invention is the provision of a device of the class immediately above described wherein the other face of said body is lined similarly to that of said one face thereof whereby to enable said body to be reversed so as to position said elongated aperture alternatively adjacent the right or left side of said body for the accommodation of either right or left-hand writers.

The above and still further objects and advantages of my invention will become apparent from the following detailed specification, appended claim and attached drawings.

Referring to the drawings, wherein like characters indicate like parts throughout the several views:

FIG. 1 is a view in plan of a conventional record book showing my novel guide mounted thereon, some parts being broken away;

FIG. 2 is a view corresponding to FIG. 1 but showing a different position of my novel guide thereon;

FIG. 3 is an enlarged view in elevation showing one side of my novel guide;

FIG. 4 is a view corresponding to FIG. 3 showing the opposite side of my novel guide; and FIG. 5 is a view in vertical section as seen from the line 5—5 of FIG. 1, on an enlarged scale.

Referring with greater particularity to the drawings, the letter A indicates in its entirety a record book such as used by teachers and instructors to periodically record the grades of a plurality of students. As there shown, a given area of individual sheets B are provided with spaced parallel horizontal lines $c$ (which preferably and as shown are uniformly spaced apart), and uniformly spaced parallel vertically extended lines $d$ which intersect the horizontal line $c$ whereby to provide rectangular marking areas $e$. Certain of the vertical lines $d'$ are emphasized to divide the sheet B into transversely spaced groups X of marking areas representing time intervals, such as weeks.

It will be noted that the outermost vertical line $d$ is in spaced relation to the outer free edge $f$ of the sheet B whereby to provide an area $g$ of vertically spaced relatively elongated rectangular areas $h$ for the recording of legendary material, such as the names of the pupils in a given class.

My novel guide is in the form of an elongated strip-like body 10 formed from any suitable sheet material, such as paper or plastic.

It will be noted that the longitudinal dimension of the body 10 is considerably greater than the vertical dimension of the sheet B in conjunction with which it is adapted to be used whereby, when the body 10 is laid thereover, the opposite ends thereof project outwardly from the upper and lower edges B1, B2 of said sheet B whereby to define upper and lower grasping tabs 11, 12, which facilitate sliding movements of said body 10 transversely of said sheet B.

Body 10 intermediate the longitudinal edges 13, 14 thereof, and preferably in closely spaced relation to the former, is provided with longitudinally extended closely spaced parallel slits 15, each of which extends for a distance corresponding substantially to the vertical dimension of the sheet B and which terminate in longitudinally spaced relation to the grasping tabs 11, 12. Slits 15 define therebetween an anchoring band 16 engageable with the underside B3 of the sheet B when said sheet B is caused to extend transversely through said slits 15, as shown particularly in FIGS. 1, 2 and 5.

By positioning of the slits 15, and anchoring band 16 formed thereby, in closely spaced relation to the longitudinal edge 13 of the body 10, a relatively wide vertically extended surface area 17 is formed adjacent the opposite longitudinal edge 14 for recording of legendary material corresponding to that normally contained in the area $g$ on the sheet B. In this regard it will be noted that the upper surface 18 of the body 10 is provided with horizontal lines 19 which are spaced apart distances corresponding to the spacings between the horizontal lines $c$ on the sheet B. Because of the relatively snug fit between the sheet B and the slits 15, the lines 19 overlie and become aligned with corresponding horizontal lines $c$ on the sheet B as the body 10 is progressively slidably moved from the free outer edge $f$ of the sheet B toward the binding 20.

It will be noted that the spacing between the slits 15 is less than the space between any three adjacent vertical lines $d$ on sheet B. Preferably this spacing corresponds approximately to that of the spacing between two adjacent of said lines $d$. In any event, when the body 10 is in operative position with the anchoring band 16 in engagement with the underside B3 of the sheet B, a vertically extended viewing aperture 21 exposing but a single vertical row of marking areas $e$ is provided.

As shown in FIG. 3, the lower surface 18' is similarly marked with horizontal lines 19'. With this arrangement the body 10 may be mounted on the sheet B, as indicated in FIG. 1, whereby the viewing aperture 21 is positioned to the right of the area 17 (wherein the same names as those appearing in the space g are found), whereby to particularly accommodate a right-handed writer as he makes his markings in the squares e of a given vertically arranged column thereof. To accommodate a left-handed writer, the body 10 may be turned 180° before mounting same on the sheet B whereby the viewing aperture 21 is positioned adjacent the left-hand of said left-handed writer with the area 17', and the legendary material contained thereon, to the right of said aperture 21, in full view of such writer.

My invention has been thoroughly tested and found to be completely satisfactory for the accomplishment of the above objects; and while I have disclosed a preferred embodiment thereof, same may well be capable of modification without departure from the scope and spirit of the appended claim.

What is claimed is:

A visual guide for record sheets having thereon an area of spaced parallel horizontal lines and uniformly spaced parallel vertical lines which intersect said horizontal lines, said guide comprising:

(a) an elongated strip-like body, the longitudinal dimension of which is greater than the vertical dimension of the sheet in conjunction with which said guide is adapted to be used, (b) said body intermediate its longitudinal edges having longitudinally extended closely spaced parallel slits each of which extends for a distance corresponding substantially to the vertical dimension of said sheet and which terminate in longitudinally spaced relation to the opposite ends thereof and define therebetween an anchoring band engageable with the underside of said sheet when extending transversely through said slits, (c) opposite ends of said body providing grasping tabs for facilitating sliding movements to said body transversely of said sheet, (d) said body having on one face thereof horizontal lines which are spaced apart distances corresponding to the spacings between the horizontal lines on said sheet and which become aligned therewith when said body is operatively slidably mounted on said sheet, (e) the space between said slits being substantially equal to the space between any two adjacent vertical lines on said sheet whereby to define a vertically elongated aperture which is adapted to completely expose the space between any given two adjacent vertical lines as said guide is slidably moved transversely of said sheet, (f) said slits being closely spaced to one of the longitudinal edges of said body whereby to provide adjacent the opposite longitudinal edge a relatively wide surface area for the recording of legendary material corresponding to that normally contained on the extreme outer edge of said sheet, and (g) said body on the other face thereof being lined similarly to that of said one face whereby to enable said body to be reversed so as to position said elongated aperture alternatively adjacent the right or left side of said body for the accommodation of either right or left-handed writers.

References Cited by the Examiner

UNITED STATES PATENTS

| | | | |
|---|---|---|---|
| 755,721 | 3/1904 | Stonehouse. | |
| 960,031 | 5/1910 | Morris. | |
| 1,240,621 | 9/1917 | Story | 281—44 |
| 1,334,525 | 3/1920 | Denhard | 116—119 |
| 1,458,253 | 6/1923 | Thomas. | |
| 1,483,176 | 2/1924 | Henrikson | 281—44 |
| 2,670,221 | 2/1954 | Wellendorf | 281—44 X |
| 2,725,030 | 11/1955 | Hughes | 281—44 |

LAWRENCE CHARLES, *Primary Examiner.*